United States Patent
Shen et al.

(10) Patent No.: US 12,047,006 B2
(45) Date of Patent: Jul. 23, 2024

(54) FLYBACK CONVERTER AND CONTROL METHOD THEREOF

(71) Applicant: Ark Semiconductor Corp. Ltd., Shenzhen (CN)

(72) Inventors: Yi-Lun Shen, Taipei (TW); Jian-Heng Guo, Taoyuan (TW)

(73) Assignee: ARK MICROELECTRONIC CORP. LTD., Shenzhen (CN)

( * ) Notice: Subject to any disclaimer, the term of this patent is extended or adjusted under 35 U.S.C. 154(b) by 327 days.

(21) Appl. No.: 17/531,812

(22) Filed: Nov. 22, 2021

(65) Prior Publication Data

US 2022/0173664 A1    Jun. 2, 2022

(30) Foreign Application Priority Data

Dec. 2, 2020   (CN) ......................... 202011400365.5

(51) Int. Cl.
*H02M 3/335*    (2006.01)
*H02M 1/08*    (2006.01)

(52) U.S. Cl.
CPC ......... *H02M 3/33569* (2013.01); *H02M 1/08* (2013.01)

(58) Field of Classification Search
CPC ... H02M 3/33569; H02M 1/08; H02M 1/0006
See application file for complete search history.

(56) References Cited

U.S. PATENT DOCUMENTS

| | | | |
|---|---|---|---|
| 7,262,979 B2 | 8/2007 | Wai | |
| 7,773,394 B2* | 8/2010 | Shen | H02M 1/32 363/56.11 |
| 7,787,262 B2 | 8/2010 | Mangtani | |
| 10,250,152 B2 | 4/2019 | Chang | |
| 10,333,417 B2 | 6/2019 | Song | |
| 2013/0077353 A1* | 3/2013 | Kuang | H05B 45/3725 363/20 |
| 2013/0301303 A1* | 11/2013 | Shen | H02M 3/33507 363/15 |
| 2015/0055379 A1 | 2/2015 | Fang | |

(Continued)

FOREIGN PATENT DOCUMENTS

| | | |
|---|---|---|
| CN | 104426378 A | 3/2015 |
| CN | 108964465 A | 12/2018 |
| CN | 111934554 A | 11/2020 |

(Continued)

*Primary Examiner* — Kyle J Moody
(74) *Attorney, Agent, or Firm* — Winston Hsu

(57) ABSTRACT

A flyback converter includes a primary winding, a main switch, a charging switch, a primary side controller and an energy storage device. The primary winding receives an input power; the primary side controller has a power input terminal and provides a first control signal and a second control signal to the main switch and the charging switch; after the main switch is turned off, the charging switch maintains turned on during a charging period. During the charging period, the input power passes through the primary winding and the charging switch, and stores a first portion of the input power in the energy storage device as a power supply energy; the power input terminal is coupled to the energy storage device, and the primary side controller receives the power supply power from the energy storage device through the power input terminal.

20 Claims, 5 Drawing Sheets

(56) References Cited

U.S. PATENT DOCUMENTS

2016/0359421 A1  12/2016  Lin

FOREIGN PATENT DOCUMENTS

| CN | 214591163 U | 11/2021 |
|---|---|---|
| TW | 201431264 A | 8/2014 |
| TW | 201810902 A | 3/2018 |
| TW | I704753 B | 9/2020 |

* cited by examiner

FLYBACK CONVERTER AND CONTROL METHOD THEREOF

BACKGROUND OF THE INVENTION

1. Field of the Invention

The present invention relates to a flyback converter and control method thereof, and more particularly, to a flyback converter and control method thereof capable of effectively taking electricity from a primary side.

2. Description of the Prior Art

Flyback converters are voltage converters whose input and output are isolated from each other, and are suitable for various power supplies. Generally speaking, a flyback converter is controlled by a power switch to store and transfer energy. When the power switch is turned on, the primary circuit in the flyback converter stores energy, and the secondary circuit is set in a reverse bias state without being charged. When the power switch is turned off (or cut off), the primary circuit in the flyback converter transfers energy to the secondary circuit, and the secondary circuit is set in a forward bias state and charged.

The new Power Delivery (PD) standard specifies that the variation range of the output voltage of the secondary circuit may be 3.3 volts to 20 volts, so the output variation of the output voltage is about 7 times the minimal voltage. In this case, since activation of the power supply Integrated Circuit (IC) of the primary circuit needs the operating voltage of at least about 16 volts. Therefore, under a situation that electricity is taken from the auxiliary winding which has a fixed voltage ratio (i.e., winding ratio) with the secondary circuit, when the output voltage of the secondary circuit is 3.3 volts, the output voltage corresponding to the auxiliary winding is 16 volts, and when the output voltage of the secondary circuit is 20 volts, the output voltage corresponding to the auxiliary winding is 112 volts, which may be too high, such that an additional low dropout regulator (LDO) is required to convert a high voltage into a low voltage first to provide to the integrated circuit. Thus, taking electricity from the auxiliary winding has low power supply efficiency, and high voltage integrated circuit component or the low dropout regulator is required, leading to increased circuit area.

On the other hand, the prior art also has a method of taking electricity from the bottom of an alternating current (AC) power supply. Under a situation that the winding ratio of the auxiliary winding to the secondary circuit is 5, when the output voltage of the secondary circuit is 20 volts, the output voltage of the auxiliary winding is 100 volts, and thus it is chosen to take electricity from the bottom of the AC power supply (about 50 volts to 60 volts); when the output voltage of the secondary circuit is 3.3 volts to 5 volts, the output voltage of the auxiliary winding is 17 volts to 25 volts, and thus it is more efficient to take electricity from the auxiliary winding that the bottom of the AC power supply (about 50 volts to 60 volts), so that it is chosen to take electricity from the auxiliary winding. As a result, taking electricity from the bottom of the AC power supply still has poor power supply efficiency, or needs to add a switching circuit and is more complicate.

However, in the prior art, no matter whether electricity is taken from the auxiliary winding or the bottom of the AC power supply, there are problems of poor power supply efficiency and increased component area. In view of this, there is a need for improvement in the prior art.

SUMMARY OF THE INVENTION

It is therefore an objective of the present invention to provide a flyback converter and control method thereof capable of effectively taking electricity from a primary side.

The present invention discloses a flyback converter. The flyback converter includes: a primary winding, including a first terminal for receiving an input power, and a second terminal; a main switch, including a first control terminal, a third terminal coupled to the second terminal of the primary winding, and a fourth terminal coupled to a ground terminal; a charging switch, including a second control terminal, a fifth terminal coupled to the second terminal of the primary winding, and a sixth terminal; a primary side controller, including a power input terminal, the primary side controller providing a first control signal to the first control terminal, and the primary side controller also providing a second control signal to the second control terminal; and an energy storage device, including a seventh terminal coupled to the sixth terminal of the charging switch, and an eighth terminal coupled to the ground terminal. After the main switch is turned off, the charging switch maintains turned on during a charging period, and during the charging period, the input energy passes through the primary winding and the charging switch and stores a first portion of the input energy in the energy storage device as a power supply energy. The power input terminal is coupled to the energy storage device, and the primary side controller receives the power supply energy from the energy storage device through the power input terminal.

The present invention further discloses a flyback converter. The flyback converter includes: a primary winding, including a first terminal for receiving an input power, and a second terminal; a lower side switch, including a first control terminal for receiving a first control signal, a third terminal, and a fourth terminal coupled to a ground terminal; a main switch, including a second control terminal, a fifth terminal coupled to the second terminal of the primary winding, and a sixth terminal coupled to the third terminal of the lower side switch; a first diode, including a first anode terminal coupled to the sixth terminal of the main switch, and a first cathode terminal; an energy storage device, including a ninth terminal coupled to the first cathode terminal of the first diode, and a tenth terminal coupled to the ground terminal; and a primary side controller, including a power input terminal coupled to the ninth terminal of the energy storage device. The primary side controller includes: an inverter, including an input terminal for receiving a third control signal, and an output terminal coupled to the second control terminal of the main switch, the inverter including a second diode, the second diode including a second anode terminal and a second cathode terminal, the second anode terminal coupled to the power input terminal, the second cathode terminal coupled to the output terminal. After the lower side switch is turned off, the main switch maintains turned on during a charging period, and during the charge period, the input energy passes through the primary winding and the main switch and stores a first portion of the input energy in the energy storage device as a power supply energy. The power input terminal is coupled to the energy storage device, and the primary side controller receives the power supply energy from the energy storage device through the power input terminal.

The present invention further discloses a control method for a flyback converter, wherein the flyback converter includes a primary winding, a main switch, a charging switch, a primary side controller and an energy storage device, and the primary winding includes a first terminal for receiving an input power, and a second terminal, and the main switch includes a first control terminal, a third terminal coupled to the second terminal of the primary winding, and a the fourth terminal coupled to a ground terminal, and the charging switch includes a second control terminal, a fifth terminal coupled to the second terminal of the primary winding, and a sixth terminal, and the primary side control includes a power input terminal and the primary side controller provides a first control signal to the first control terminal, and the primary side controller further provides a second control signal to the second control terminal, and the storage device includes a seventh terminal coupled to the sixth terminal of the charging switch, and an eighth terminal coupled to the ground terminal, and the power input terminal is coupled to the energy storage device. The control method includes: after the main switch is turned off, the charging switch maintaining turned on during a charging period, and during the charging period, the input energy passing through the primary winding and the charging switch and storing a first portion of the input energy in the energy storage device as a power supply energy; and after the charging period expires, turning off and cutting off the charging switch, and the energy storage device releasing the power supply energy to the primary side controller through the power input terminal.

The present invention further discloses a control method for a flyback converter, wherein the flyback converter includes a primary winding, a lower side switch, a main switch, a first diode, an energy storage device and a primary side controller, and the primary winding includes a first terminal for receiving an input power, and a second terminal, and the lower side switch includes a first control terminal for receiving a first control signal, a third terminal, and a fourth terminal coupled to a ground terminal, and the main switch includes a second control terminal, a fifth terminal coupled to the second terminal of the primary winding, and a sixth terminal coupled to the third terminal of the lower side switch, and the first diode includes an anode terminal coupled to the sixth terminal of the main switch, and a first cathode terminal, and the energy storage device includes a ninth terminal coupled to the first cathode terminal of the first diode, and a tenth terminal coupled to the ground terminal, and the primary side controller includes a power input terminal coupled to the ninth terminal of the energy storage device, and the primary side controller includes a inverter, and the inverter includes an input terminal for receiving a third control signal, and an output terminal coupled to the second control terminal of the main switch, and the inverter includes a second diode, and the second diode includes a second anode terminal and a second cathode terminal, and the second anode terminal is coupled to the power input terminal, and the second cathode terminal is coupled to the output terminal. The control method includes: after the lower side switch is turned off, the main switch maintaining turned on during a charging period, and during the charge period, the input energy passing through the primary winding and the main switch and storing a first portion of the input energy in the energy storage device as a power supply energy; and after the charging period expires, turning off and cutting off the main switch, and the energy storage device releasing the power supply energy to the primary side controller through the power input terminal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
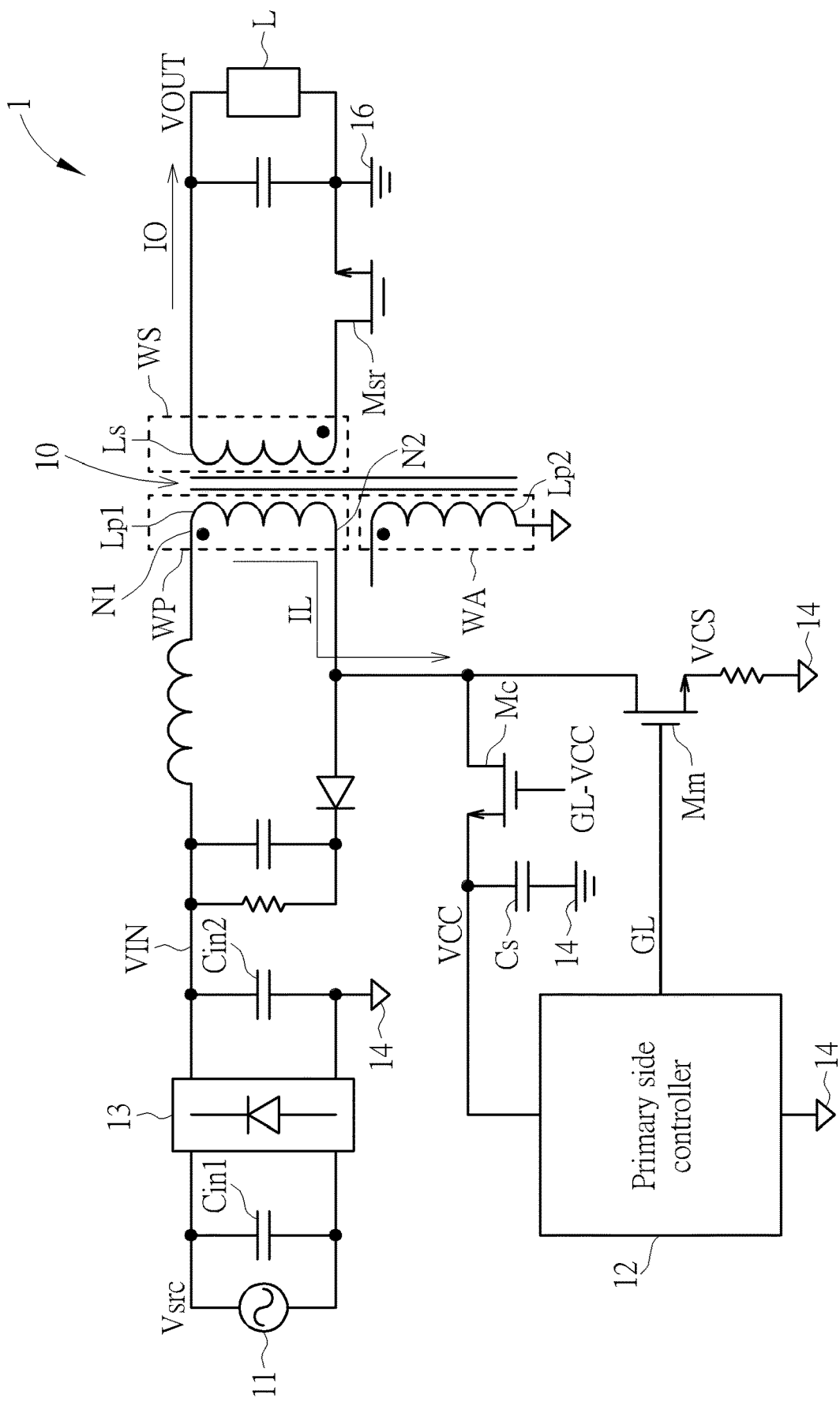
FIG. 1 is a circuit diagram of a flyback converter according to an embodiment of the present invention.

FIG. 1 is a circuit diagram of a flyback converter 1 according to an embodiment of the present invention. The flyback converter 1 receives a voltage Vsrc from a voltage source 11 for a buck or boost conversion to generate an output voltage VOUT, and provides the output voltage VOUT to a load L. The voltage Vsrc may be a direct current (DC) voltage or an alternating current (AC) voltage, the output voltage VOUT may be a DC voltage, and the voltage source 11 may be a mains or a battery.

The flyback converter 1 includes a capacitor Cin1, a rectifier 13, a capacitor Cin2, a transformer 10, a main switch Mm, a charging switch Mc, an energy storage device Cs, a primary side controller 12, a synchronous rectifier Msr, a resistor Rs, and grounding terminals 14 and 16. The primary side controller 12 may control switching of the main switch Mm. When the main switch Mm is switched between two states of turned on (or conducted) and turned off (or cut off), each time the main switch Mm switch is turned on (and/or conducted) for a fixed time period, the primary side of the flyback converter 1 passes substantially the same power to the secondary side of the flyback converter 1. When the load L is a light load and less power is drawn, the controller 12 may control the main switch Mm to operate at a lower switching frequency, that is, a longer switching period, and the main switch Mm starts being turned on less frequently. When the load L is a heavy load and more power is drawn, the controller 12 may control the main switch Mm to operate at a higher switching frequency, that is, a shorter switching period, and the main switch Mm starts being turned on more frequently to reduce switching losses and increase efficiency.

The transformer 10 includes a primary winding WP including a first terminal N1 for receiving the input power VIN, and a second terminal N2; a reference winding WA; and a secondary winding WS for outputting the output voltage VOUT. The primary winding WP and the reference winding WA belong to the primary side, and the secondary winding WS belongs to the secondary side. The main switch Mm includes a first control terminal, a third terminal coupled to a second terminal N2 of the primary winding WP, and a fourth terminal. The charging switch Mc includes a second control terminal, a fifth terminal coupled to the second terminal N2 of the primary winding WP, and a sixth terminal. The primary controller 12 includes a power input terminal, and the primary controller 12 provides a first control signal GL to the first control terminal, and the primary side controller 12 also provides a second control signal GL-VCC to the second control terminal. The primary side controller 12 may be a pulse width modulation (PWM) controller. The energy storage device Cs includes a seventh terminal coupled to the sixth terminal of the charging switch Mc, and an eighth terminal coupled to the ground terminal 14. The energy storage device Cs may be a capacitor.

The capacitor Cin1 may filter out the high-frequency noise of the voltage Vsrc. The rectifier 13 may perform rectifying on the voltage Vsrc, and the capacitor Cin2 may smooth the rectified voltage Vsrc to generate the input voltage VIN. The winding ratio of the primary winding WP to the secondary winding WS may be P:1, where P is a positive number. In some embodiments, P may be greater than 1, and the transformer 10 may be a step-down transformer. Polarities of the primary winding WP and the secondary winding WS may be opposite. The winding ratio of the primary winding WP to the reference winding WA may be Q:1, and Q is a positive number greater than 1. Polarities of the primary winding WP and the reference winding WA may be the same. The primary winding WP has a primary mutual inductance Lp1 and leakage inductance, the secondary winding WS has a secondary mutual inductance Ls, and the reference winding WA has an auxiliary mutual inductance Lp2. In the following paragraphs, the primary controller 12 provides the first control signal GL and the second control signal GL-VCC to control the main switch Mm and the charging switch Mc, to illustrate taking electricity operation of the flyback converter 1. The operations of other components in the primary side and secondary side of the flyback converter 1 are well known to those skilled in the art, and will not be repeated here for the sake of brevity.

Figure 2:
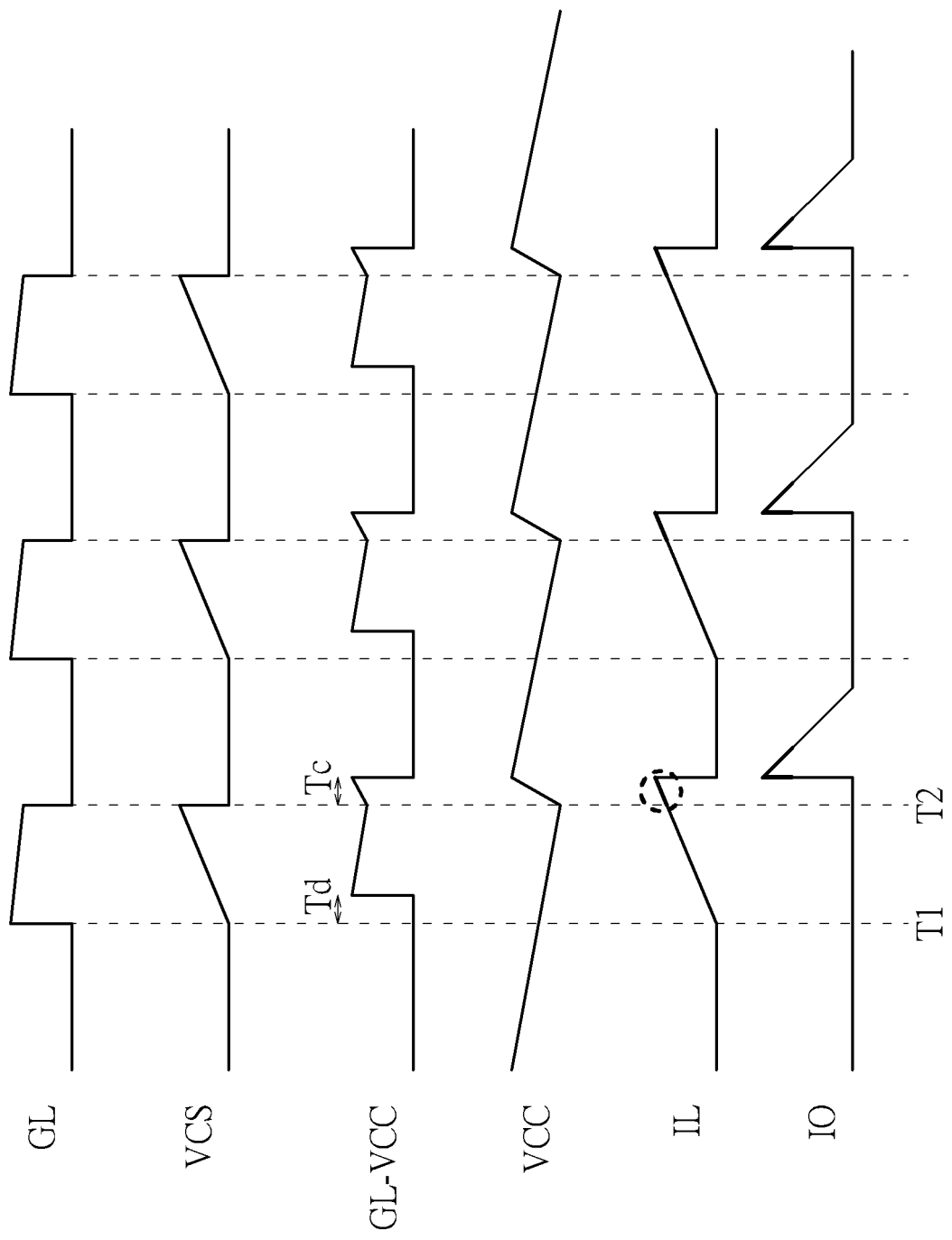
FIG. 2 is a schematic diagram of operations of the flyback converter shown in FIG. 1 according to an embodiment of the present invention.

Please refer to FIG. 2, which is a schematic diagram of operations of the flyback converter 1 shown in FIG. 1 according to an embodiment of the present invention. As shown in FIG. 1 and FIG. 2, after the first control signal GL is switched to the low level to control the main switch Mm to be turned off (and/or cut off) (e.g. a time point T2), the second control signal GL-VCC maintains a high level to control the charging switch Mc to maintain turned on in a charging period Tc. During the charging period Tc, the input power VIN passes through the primary winding WP and the charging switch Mc, and stores a first portion of the input energy VIN in the energy storage device Cs as a power supply energy. The power input terminal of the primary side controller 12 is coupled to the energy storage device Cs, and the primary side controller 12 receives the power supply energy from the energy storage device Cs through the power input terminal. Subsequently, after the charging period Tc expires, the charging switch Mc is turned off, the energy storage device Cs releases the power supply energy to the primary side controller 12 through the power input power terminal (as shown in FIG. 2, as the energy storage device Cs continuously provides power to the primary side controller 12, the operating voltage VCC will drop over time). In this way, the present invention may take electricity to store in the energy storage device Cs during the charging period Tc, and may effectively take electricity as a power input for sustaining the normal operation of the primary side controller 12.

In detail, the seventh terminal of the energy storage device Cs has an operating voltage VCC. Since the power input terminal of the primary side controller 12 is coupled to the seven terminal of the energy storage device Cs and the received power supply voltage is related to the operating voltage VCC, the high voltage levels of the first control signal GL and the second control signal GL-VCC generated by the primary controller 12 for the main switch Mm and the charging switch Mc is related to the operating voltage VCC and less than or equal to the operating voltage VCC (as shown in FIG. 2, the operating voltage VCC provided by the energy storage device Cs drops when providing power to the primary side controller 12, and is charged to rise during the charging period Tc, and the high voltage levels of the first control signal GL and the second control signal GL-VCC vary with the operating voltage VCC). In this case, the charging switch Mc may be designed to include an N channel depletion type Metal Oxide Semiconductor Field Effect Transistor (MOSFET), and a threshold voltage of the N channel depletion type MOSFET is negative, such that when the high voltage level of the second control signal GL-VCC is less than or equal to the operating voltage VCC, the charging switch Mc may still maintain turned on during the charging period Tc.

On the other hand, both the main switch Mm and the charging switch Mc are N channel. After the main switch Mm is turned off and the charging switch Mc maintains turned on during the charging period Tc, the first control signal GL is switched from a high voltage level to a low voltage level, such that the second control signal GL-VCC maintains the high voltage level during the charging period Tc. The charging switch Mc maintains turned on during the charging period Tc to charge the energy storage device Cs, to increase the operating voltage VCC. In this case, when the main switch Mm is just turned off, the voltage of the fifth terminal of the charging switch Mc does not bounce back to several hundred volts with the primary winding WP, and may charge the operating voltage VCC in a state of 10 to 20 V, to improve the conversion efficiency of taking electricity. Further, a second portion of the input power VIN is stored in the primary winding WP during the charging period Tc (as shown in FIG. 2, the thick portion of the current IL continuously rises). After both the main switch Mm and the charging switch Mc are turned off, the second portion of the input power VIN is outputted to the secondary winding WS (as the thick portion of the current IO shown in FIG. 2). In this way, when the present invention charges the energy storage device Cs with a lower voltage to increase the operating voltage VCC, energy may be stored in the primary winding WP at the same time for subsequent outputting to the secondary winding WS, thereby effectively utilizing energy.

In addition, a time point that the main switch Mm is turned on (for example, a time point T1) is earlier than a time point that the charging switch Mc is turned on, so that the main switch Mm is turned on to reduce the voltage of the fifth terminal of the charging switch Mc first, and then the charging switch Mc is turned on. In other words, after the main switch Mm is turned on, the charging switch Mc maintains turned off during a delay period Td. During the delay period Td, the main switch Mm is turned on to reduce the voltage of the fifth terminal of the charging switch Mc. After the delay period Td expires, the charging switch Mc is turned on. In this case, the fifth terminal of the charging switch Mc is originally connected to the primary winding WP and has the voltage of hundreds of volts. Then, during the delay period Td, the main switch Mm is turned on first to reduce the voltage of the fifth terminal of the charging switch Mc to a voltage VCS of the fourth terminal of the main switch Mm plus the source drain voltage difference of the main switch Mm to close to 0 volts. After the delay period Td expires, the charging switch Mc is turned on when the fifth terminal is close to 0 volts. Thus, the charging switch Mc of the present invention is switched at a small voltage, to reduce the switching loss, so as to have a better operating efficiency.

It is noted that, the above-described embodiment mainly charges the energy storage device Cs during the charging period Tc with a small voltage to raise the operating voltage VCC, while storing energy in the primary winding WP for subsequent outputting to the secondary winding WS, thereby utilizing energy effectively. Those skilled in the art may make modifications or alterations accordingly, and are not limited thereto. For example, the above-described embodiment adds the charging switch Mc between the high voltage main switch Mm and the primary winding WP, to take electricity from the primary side of the power. In other embodiments, a lower side switch and other components are added between the high voltage main switch Mm and the ground terminal, to take electricity from the primary side as a power input for maintaining the normal operation of the primary side controller 12.

Figure 3:
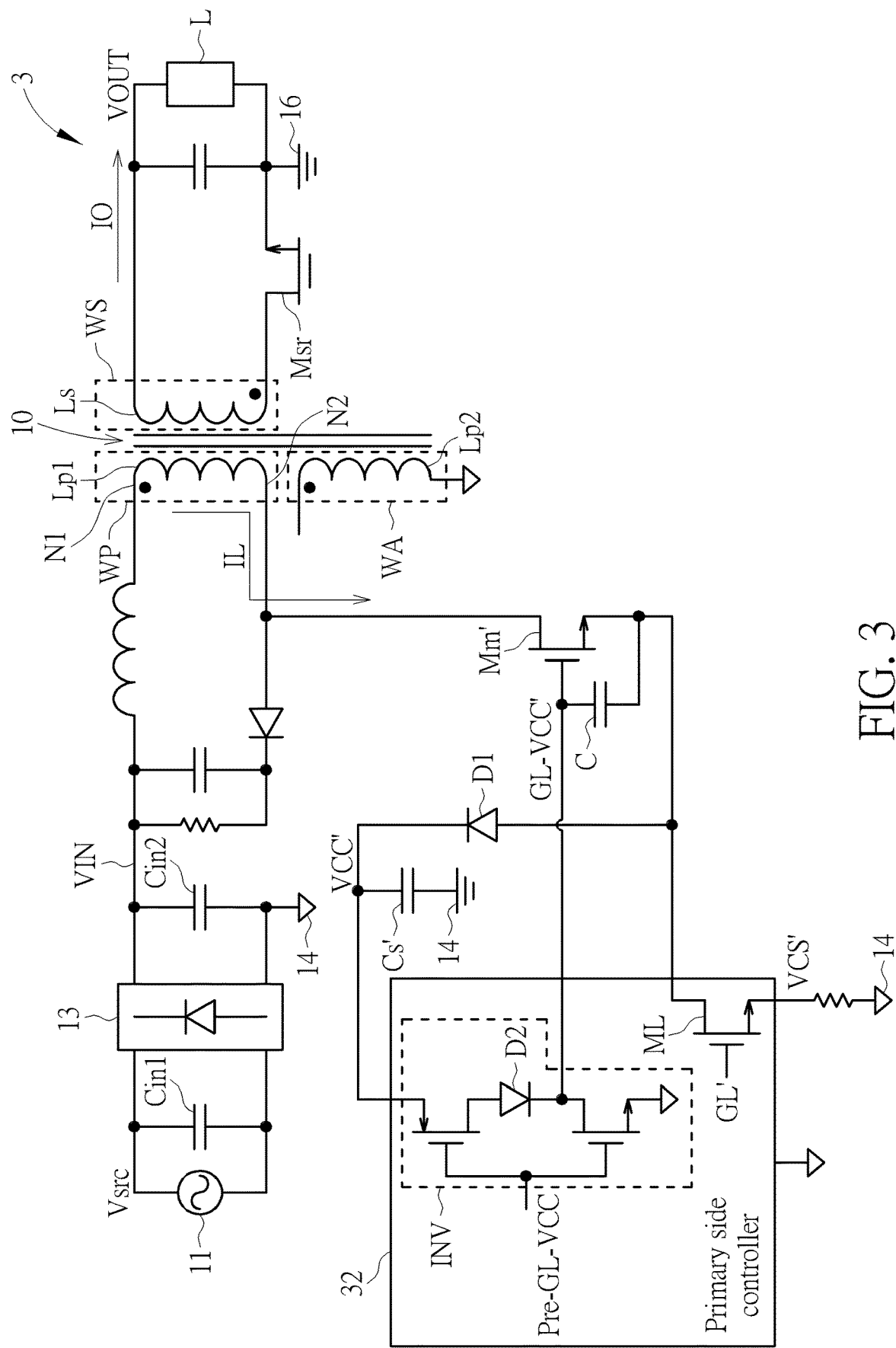
FIG. 3 is a circuit diagram of another flyback converter according to an embodiment of the present invention.

In detail, please refer to FIG. 3, which is a circuit diagram of a flyback converter 3 according to an embodiment of the present invention. The flyback converter 3 and the flyback converter 1 are partially similar, and therefore the components with similar structures and functions are denoted by the same symbols. Related operations can be derived by referring to the above description, and are omitted herein for brevity.

The main difference between the flyback converter 3 and the flyback converter 1 is that the circuit structure for taking electricity is different. The flyback converter 3 includes the primary winding WP, a main switch Mm', a lower side switch ML, and an energy storage device Cs', a primary side controller 32, a first diode D1. The primary winding WP includes the first terminal N1 for receiving the input power VIN, and a second terminal N2. The lower side switch ML includes a first control terminal for receiving the first control signal GL', a third terminal, and a fourth terminal coupled to the ground terminal 14. The main switch Mm' includes a second control terminal, a fifth terminal coupled to the second terminal of the primary winding, and a sixth terminal coupled to the third terminal of the lower side switch ML. The first diode D1 includes a first anode terminal coupled to the sixth terminal of the main switch Mm', and a first cathode terminal. The energy storage device Cs' includes a ninth terminal coupled to the first cathode terminal of the first diode D1, and a tenth terminal coupled to the ground terminal 14. The primary controller 32 includes a power input terminal coupled to the ninth terminal of the energy storage device Cs'. The primary side controller 32 includes an inverter INV. The inverter INV includes an input terminal for receiving a third control signal Pre-GL-VCC and an output terminal coupled to the second control terminal of the main switch Mm'. The inverter INV includes a second diode D2. The second diode D2 includes a second anode terminal and a second cathode terminal. The second anode terminal is coupled to the power input terminal, and the second cathode terminal is coupled to the output terminal.

Figure 4:
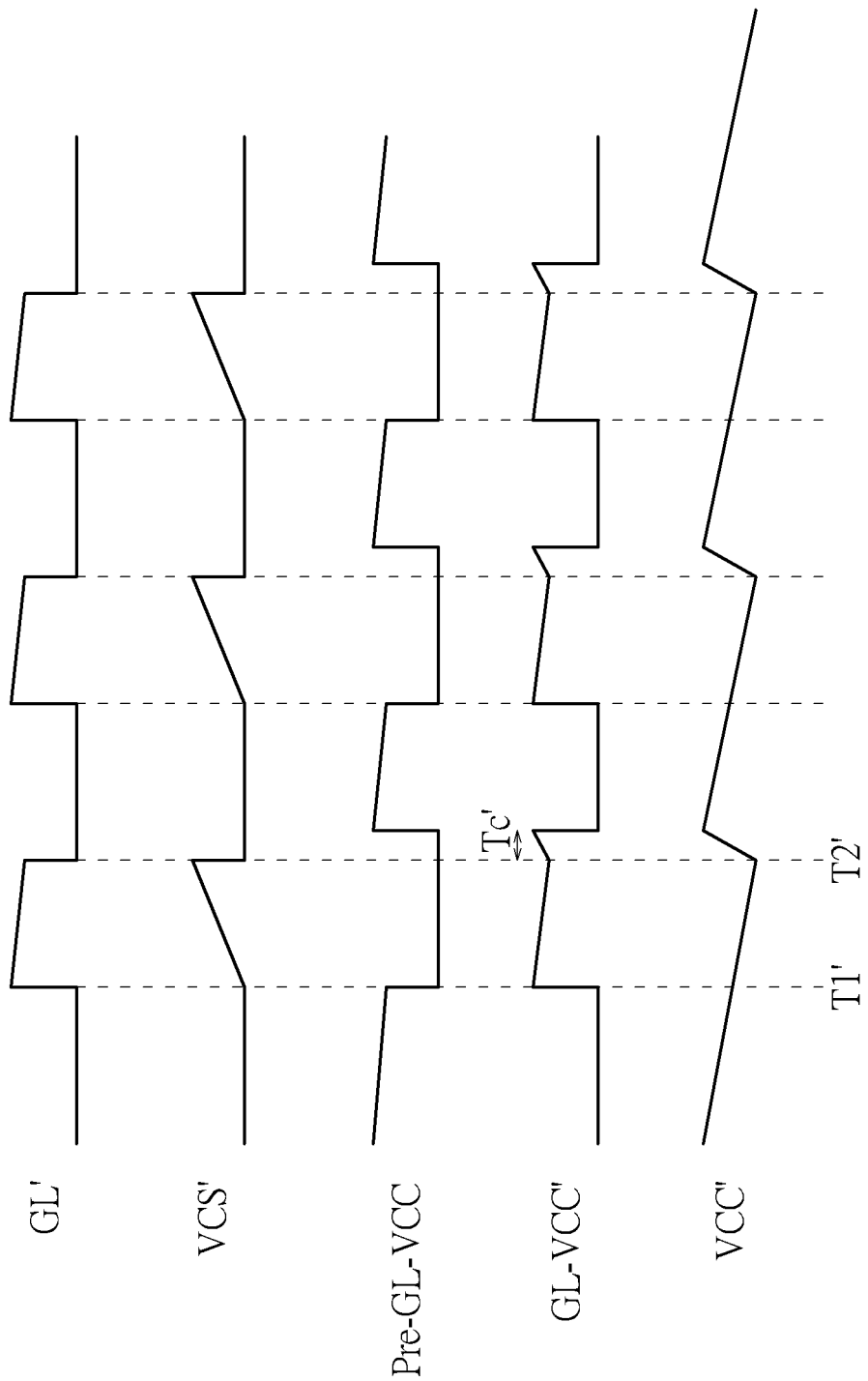
FIG. 4 is a schematic diagram of operations of the flyback converter shown in FIG. 3 according to an embodiment of the present invention.

Please refer to FIG. 4 together. FIG. 4 is a schematic diagram of operations of the flyback converter 3 shown in FIG. 3 according to an embodiment of the present invention. As shown in FIG. 3 and FIG. 4, after the lower side switch ML is turned off, the main switch Mm' maintains turned on during the charging period Tc'. During the charging period Tc', the input power VIN passes through the primary winding WP and the main switch Mm' and stores a first portion of the input power VIN in the energy storage device Cs' as a power supply energy. The power input terminal of the primary side controller 32 is coupled to the energy storage device Cs', and the primary controller 32 receives the power supply energy from the energy storage device Cs' through the power input terminal. Then, after the charging period Tc' expires, the main switch Mm' is turned off, and the energy storage device Cs' releases the power supply energy to the primary controller 32 through the power input terminal. In this way, the present invention may take electricity and store it in the energy storage device Cs' during the charging period Tc', and may effectively take electricity as a power input for maintaining the normal operation of the primary side controller 32.

In detail, the lower side switch ML is an N channel MOSFET and the main switch Mm' is also an N channel MOSFET. When the first control signal GL' is switched to a high voltage level (such as a time point T1'), the lower side switch ML is conducted to reduce the voltage of the third terminal (such as the drain) to turn off the first diode D1. At this time, the third control signal Pre-GL-VCC is also switched to a low voltage level, so that the second anode terminal of the second diode D2 may receive energy from the power input terminal. Thus, the second diode D2 is conducted and the output terminal of the inverter INV generates an output signal as the second control signal GL-VCC' received by the second control terminal of the main switch Mm', so that the second control signal GL-VCC' is also switched to a high voltage level to conduct the main switch Mm'. Then, a capacitor C between the first control terminal of the main switch Mm' and the sixth terminal of the main switch Mm' stores a bias charge when the main switch Mm' is conducted. The capacitor C may be a parasitic capacitor or an external capacitor of the main switch Mm'. Thus, by turning on the second diode D2 and the main switch Mm' and closing the first diode D1, the present invention prevents the energy storage device Cs' discharging to the ground terminal 14 due to conduction of the lower side switch ML.

Then, when the first control signal GL' switches from a high voltage level to a low voltage level, and the lower side switch ML is turned off (for example, at a time point T2'), the bias charge stored in the capacitor C maintains a turn on bias between the first control terminal and the sixth terminal of the main switch Mm' during the charging period Tc'. The turn on bias maintains the main switch Mm' conducted during the charging period Tc', and the turn on bias raises a voltage of the cathode terminal of the second diode D2, so that the voltage of the cathode terminal of the second diode D2 is higher than a voltage of the anode terminal of the second diode D2, and thus the second diode D2 is turned off. On the other hand, the ninth terminal of the energy storage device Cs' has an operating voltage VCC'. When the lower side switch ML is turned off and the main switch Mm' maintains turned on during the charging period Tc', the voltage of the six terminal (such as the source) of the main switch Mm' increases, so that the first diode D1 is conducted to charge the energy storage device Cs' for raising the operating voltage VCC'. The power input terminal of the primary side controller 32 is coupled to the ninth terminal of the energy storage device Cs'. The power supply energy is related to the operating voltage VCC'. In this way, the present invention may turn off the second diode D2 and utilize the bias charge stored in the capacitor C to turn on the main switch Mm', to turn on the first diode D1 to charge the energy storage device Cs'.

In this case, after the lower-side switch ML is turned off and the main switch Mm' is conducted, the voltage of the sixth terminal (e.g., source) of the main switch Mm' increases to charge the energy storage device Cs' to raise the operating voltage VCC' (about the voltage of the anode terminal of the second diode D2), and the voltage of the second control terminal (e.g. gate) of the main switch Mm' is the voltage of the sixth terminal plus the turn on bias (about the voltage of the cathode terminal of the second diode D2), such that the voltage of the cathode terminal of the second diode D2 is higher than the voltage of the anode terminal of the second diode D2. At this time, the third control signal Pre-GL-VCC is at a low voltage level and the operating voltage VCC' is less than the voltage of the second control terminal of the main switch Mm', and the second diode D2 is turned off so that the primary side controller 32 stops generating an output signal at the output terminal of the inverter INV as the second control signal GL-VCC' received by the second control terminal of the master switches Mm'. In this case, a second portion of the input power VIN is stored in the primary winding WP during the charging period Tc'. After both the main switch Mm' and the lower side switch ML are turned off, the second portion of the input power VIN is outputted to the secondary winding WS. It should be noted that the flyback converter 3 needs to include the reference winding WA, and thus the detection signal of the safety protection mechanism needs to be captured. Thus, the present invention may charge the energy storage device Cs' to raise the operating voltage VCC', while storing energy in the primary winding WP at the same time for subsequent outputting to the secondary winding WS, thereby effectively utilizing energy. This embodiment of FIG. 3 does not need to use an N channel depletion type MOSFET, and may more effectively reduce the required area and cost of the IC components.

Figure 5:
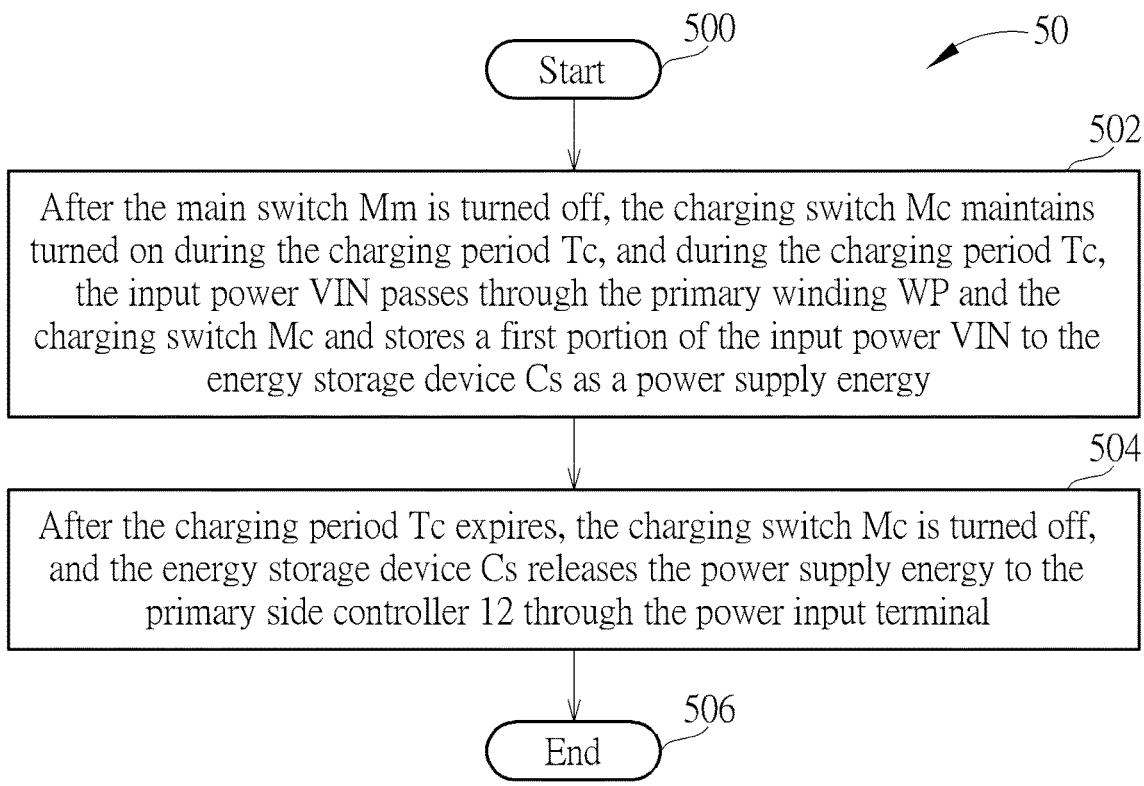
FIG. 5 is a schematic diagram of a control process according to an embodiment of the present invention.

Thus, the electricity taking operation of the flyback converter 1 may be summarized into a control process 50 as shown in FIG. 5, which includes the steps of:

Step 500: Start.

Step 502: After the main switch Mm is turned off, the charging switch Mc maintains turned on during the charging period Tc, and during the charging period Tc, the input power VIN passes through the primary winding WP and the charging switch Mc and stores a first portion of the input power VIN to the energy storage device Cs as a power supply energy.

Step 504: After the charging period Tc expires, the charging switch Mc is turned off, and the energy storage device Cs releases the power supply energy to the primary side controller 12 through the power input terminal.

Step 506: End.

Figure 6:
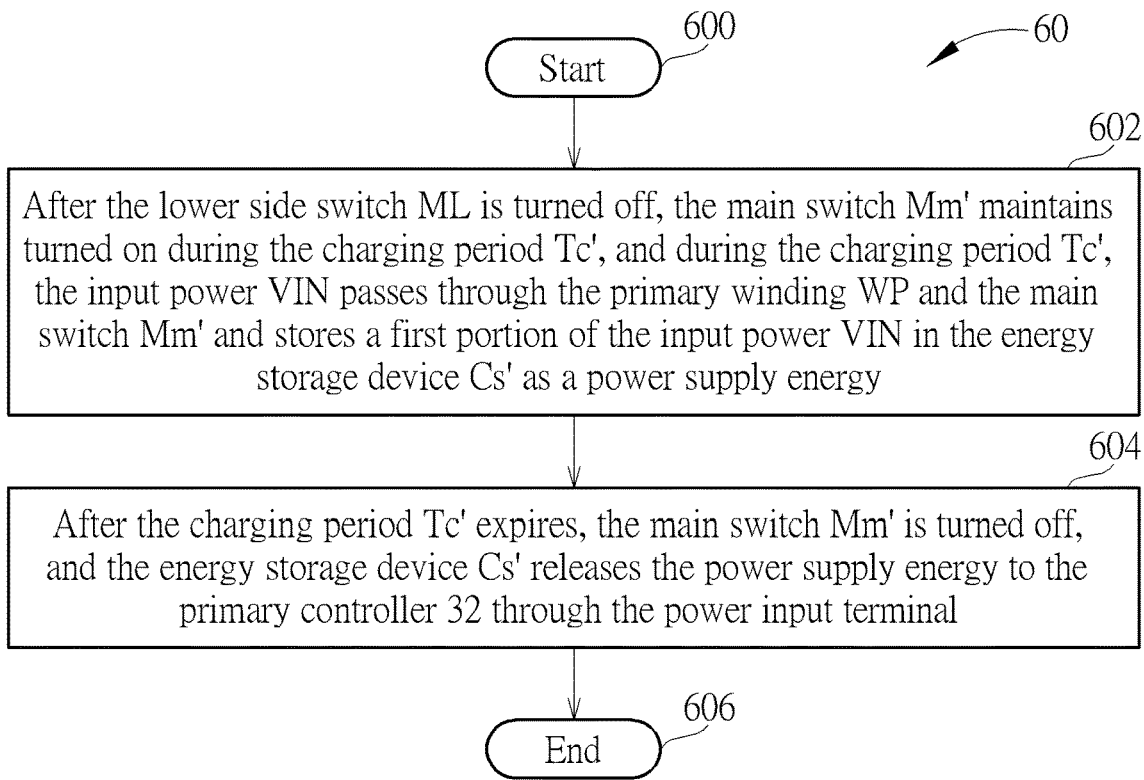
FIG. 6 is a schematic diagram of another control process according to an embodiment of the present invention.

Thus, the electricity taking operation of the flyback converter 3 may be summarized into a control process 60 as shown in FIG. 6, which includes the steps of:

Step 600: Start.

Step 602: After the lower side switch ML is turned off, the main switch Mm' maintains turned on during the charging period Tc', and during the charging period Tc', the input power VIN passes through the primary winding WP and the main switch Mm' and stores a first portion of the input power VIN in the energy storage device Cs' as a power supply energy.

Step 604: After the charging period Tc' expires, the main switch Mm' is turned off, and the energy storage device Cs' releases the power supply energy to the primary controller 32 through the power input terminal.

Step 606: End.

For the detailed operations of the control processes 50 and 60, please refer to the relevant contents of the flyback converters 1 and 3, which will not be repeated here for the sake of brevity.

In summary, the present invention may take electricity from the primary side to charge the energy storage device during the charging period to raise the operating voltage, while storing energy in the primary winding at the same time for subsequent outputting to the secondary winding, thereby effectively utilizing energy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flyback converter, comprising:
  a primary winding, comprising a first terminal for receiving an input power, and a second terminal;
  a main switch, comprising a first control terminal, a third terminal coupled to the second terminal of the primary winding, and a fourth terminal coupled to a ground terminal;
  a charging switch, comprising a second control terminal, a fifth terminal coupled to the second terminal of the primary winding, and a sixth terminal, wherein a switching frequency of the charging switch is substantially the same as a switching frequency of the main switch;
  a primary side controller, comprising a power input terminal, the primary side controller providing a first control signal to the first control terminal, and the primary side controller also providing a second control signal to the second control terminal; and
  an energy storage device, comprising a seventh terminal coupled to the sixth terminal of the charging switch, and an eighth terminal coupled to the ground terminal;
  wherein after the main switch is turned off, the charging switch maintains turned on during a charging period, and during the charging period, an input energy passes through the primary winding and the charging switch and stores a first portion of the input energy in the energy storage device as a power supply energy;
  wherein the power input terminal is coupled to the energy storage device, and the primary side controller receives the power supply energy from the energy storage device through the power input terminal.

2. The flyback converter of claim 1, wherein
  only when the main switch remains turned on, the charging switch is switched from turned off into turned on;
  wherein when the charging switch is turned on, the main switch is only switched from turned on into turned off once;
  wherein a number of times the charging switch is turned on is substantially the same as a number of times the main switch is turned on.

3. The flyback converter of claim 1, wherein the main switch and the charging switch are N channel Metal Oxide Semiconductor Field Effect Transistors (MOSFETs), and after the main switch is turned off and the charging switch maintains turned on during the charging period, the first control signal switches from a high voltage level to a low voltage level, such that the second control signal maintains the high voltage level during the charging period.

4. The flyback converter of claim 1, wherein the seventh terminal of the energy storage device has an operating voltage, the charging switch maintains turned on during the charging period to charge the energy storage device, to raise the operating voltage, and the power input terminal is coupled to the seventh terminal of the energy storage device, and the power supply energy is related to the operating voltage.

5. The flyback converter of claim 1, wherein the flyback converter further comprises a secondary winding, and a second portion of the input power is stored in the primary winding during the charging period, and after the main switch and the charging switch are both turned off, the second portion of the input energy is outputted to the secondary winding.

6. The flyback converter of claim 1, wherein a time point that the main switch is turned on is earlier than a time point that the charging switch is turned on, and after the main switch is turned on first to reduce a voltage of the fifth terminal of the charging switch, the charging switch is turned on.

7. The flyback converter of claim 6, wherein after the main switch is turned on, the charging switch maintains turned off during a delay period, and the main switch is turned on to reduce a voltage of the fifth terminal of the charging switch during the delay period, and the charging switch is turned on after the delay period expires.

8. A flyback converter, comprising:
a primary winding, comprising a first terminal for receiving an input power, and a second terminal;
a lower side switch, comprising a first control terminal for receiving a first control signal, a third terminal, and a fourth terminal coupled to a ground terminal;
a main switch, comprising a second control terminal, a fifth terminal coupled to the second terminal of the primary winding, and a sixth terminal coupled to the third terminal of the lower side switch;
a first diode, comprising a first anode terminal coupled to the sixth terminal of the main switch, and a first cathode terminal;
an energy storage device, comprising a ninth terminal coupled to the first cathode terminal of the first diode, and a tenth terminal coupled to the ground terminal; and
a primary side controller, comprising a power input terminal coupled to the ninth terminal of the energy storage device, and comprising:
an inverter, comprising an input terminal for receiving a third control signal, and an output terminal coupled to the second control terminal of the main switch, the inverter comprising a second diode, the second diode comprising a second anode terminal and a second cathode terminal, the second anode terminal coupled to the power input terminal, the second cathode terminal coupled to the output terminal;
wherein after the lower side switch is turned off, the main switch maintains turned on during a charging period, and during the charge period, the input energy passes through the primary winding and the main switch and stores a first portion of the input energy in the energy storage device as a power supply energy;
wherein the power input terminal is coupled to the energy storage device, and the primary side controller receives the power supply energy from the energy storage device through the power input terminal.

9. The flyback converter of claim 8, wherein the lower side switch is an N channel MOSFET, and when the first control signal is at a high voltage level, the lower side switch is turned on, to reduce a voltage of the third terminal to turn off the first diode.

10. The flyback converter of claim 9, wherein the main switch is an N channel MOSFET, when the first control signal is at the high voltage level and the third control signal enables the second anode terminal to receive power via the power input terminal, the second diode is turned on, so that the second control signal is at a high voltage level to turn on the main switch.

11. The flyback converter of claim 8, wherein a capacitor between the first control terminal of the main switch and the sixth terminal of the main switch stores a bias charge when the main switch is turned on, and the capacitor is a parasitic capacitor or an external capacitor of the main switch.

12. The flyback converter of claim 11, wherein after the first control signal switches from a high voltage level is to a low voltage level and thus the lower side switch is turned off, the bias charge keeps a turn on bias between the first control terminal and the sixth terminal during the charging period, and the turn on bias maintains the main switch turned on during the charging period, and the turn on bias raises a voltage of the cathode terminal of the second diode, such that the voltage of the cathode terminal of the second diode is higher than a voltage of the anode terminal of the second diode and thus the second diode is turned off.

13. The flyback converter of claim 12, wherein the ninth terminal of the energy storage device has an operating voltage, when the lower side switch is turned off and the main switch maintains turned on during the charging period, a voltage of the sixth terminal of the main switch increases, such that the first diode is turned on to charge the energy storage device for raising the operating voltage, and the power input terminal is coupled to the ninth terminal of the energy storage device, and the power supply energy is related to the operating voltage.

14. The flyback converter of claim 13, wherein when the third control signal is at a low voltage level and the operating voltage is less than a voltage of the second control terminal of the main switch, the second diode is turned off, so that the primary side controller stops generating an output signal at the output terminal of the inverter as the second control signal received by the second control terminal of the main switch.

15. The flyback converter of claim 12, wherein the flyback converter further comprises a secondary winding, and a second portion of the input power is stored in the primary winding during the charging period, and after the main switch and the lower side switch are both turned off, the second portion of the input energy is outputted to the secondary winding.

16. A control method for a flyback converter, wherein the flyback converter comprises a primary winding, a main switch, a charging switch, a primary side controller and an energy storage device, and the primary winding comprises a first terminal for receiving an input power, and a second terminal, and the main switch comprises a first control terminal, a third terminal coupled to the second terminal of the primary winding, and a fourth terminal coupled to a ground terminal, and the charging switch comprises a second control terminal, a fifth terminal coupled to the second terminal of the primary winding, and a sixth terminal, and the primary side control comprises a power input terminal and the primary side controller provides a first control signal to the first control terminal, and the primary side controller further provides a second control signal to the second control terminal, and the storage device comprises a seventh terminal coupled to the sixth terminal of the charging switch, and an eighth terminal coupled to the ground terminal, and the power input terminal is coupled to the energy storage device, and the control method comprises:

after the main switch is turned off, the charging switch maintaining turned on during a charging period, and during the charging period, the input energy passing through the primary winding and the charging switch and storing a first portion of the input energy in the energy storage device as a power supply energy; and after the charging period expires, turning off the charging switch, and the energy storage device releasing the power supply energy to the primary side controller through the power input terminal;

wherein a switching frequency of the charging switch is substantially the same as a switching frequency of the main switch.

17. The control method of claim 16, wherein only when the main switch remains turned on, the charging switch is switched from turned off into turned on;

wherein when the charging switch is turned on, the main switch is only switched from turned on into turned off once; and wherein a number of times the charging switch is turned on is substantially the same as a number of times the main switch is turned on.

18. The control method of claim 17, wherein the control method further comprises: after the main switch is turned on, the charging switch maintaining turned off during a delay period, and turning on and conducting the main switch to reduce a voltage of the fifth terminal of the charging switch during the delay period, and turning on and conducting the charging switch after the delay period expires.

19. A control method for a flyback converter, wherein the flyback converter comprises a primary winding, a lower side switch, a main switch, a first diode, an energy storage device and a primary side controller, and the primary winding comprises a first terminal for receiving an input power, and a second terminal, and the lower side switch comprises a first control terminal for receiving a first control signal, a third terminal, and a fourth terminal coupled to a ground terminal, and the main switch comprises a second control terminal, a fifth terminal coupled to the second terminal of the primary winding, and a sixth terminal coupled to the third terminal of the lower side switch, and the first diode comprises an anode terminal coupled to the sixth terminal of the main switch, and a first cathode terminal, and the energy storage device comprises a ninth terminal coupled to the first cathode terminal of the first diode, and a tenth terminal coupled to the ground terminal, and the primary side controller comprises a power input terminal coupled to the ninth terminal of the energy storage device, and the primary side controller comprises a inverter, and the inverter comprises an input terminal for receiving a third control signal, and an output terminal coupled to the second control terminal of the main switch, and the inverter comprises a second diode, and the second diode comprises a second anode terminal and a second cathode terminal, and the second anode terminal is coupled to the power input terminal, and the second cathode terminal is coupled to the output terminal, and the control method comprises:

after the lower side switch is turned off, the main switch maintaining turned on during a charging period, and during the charge period, the input energy passing through the primary winding and the main switch and storing a first portion of the input energy in the energy storage device as a power supply energy; and after the charging period expires, turning off the main switch, and the energy storage device releasing the power supply energy to the primary side controller through the power input terminal.

20. The control method of claim 19, wherein the flyback converter further comprises a secondary winding, and the control method further comprising:

storing a second portion of the input power in the primary winding during the charging period; and after the main switch and the lower side switch are both turned off, outputting the second portion of the input energy to the secondary winding.

\* \* \* \* \*